United States Patent Office 3,113,891
Patented Dec. 10, 1963

3,113,891
AUTOTHERMIC ELECTROLYTE
Milton Comanor and Roland Chireau, New York, N.Y., assignors to Yardney International Corp., New York, N.Y., a corporation of New York
No Drawing. Filed June 10, 1960, Ser. No. 35,130
10 Claims. (Cl. 136—154)

This invention relates to electrochemical batteries or accumulators. More particularly, the invention relates to an electrolyte composition and a process for preparing same.

Deferred action batteries are very often utilized under conditions wherein they are subjected to low temperatures. At such temperatures, the batteries develop high internal resistances because of polarization at the electrode surfaces and because of the low conductivity of the electrolyte. These high internal resistances are of such magnitude that they interfere with the discharge of the batteries at a rapid rate. In the past this problem was overcome by heating such batteries from an external source or by causing a short circuit in the leads, thereby permitting the heat generated by the internal resistance to warm the battery to minimum operating temperature. However this practice requires about one hour to bring a battery from —40° C. to operating temperature which is too slow for many of today's power requirements.

Attempts have been made to heat the electrolyte prior to its contact with the electrode but difficulty is encountered in providing enough heat by electrical or chemical means to raise the temperature to operating range. One reason for this is the small amount of electrolyte needed in comparison with the large mass of cell components. By heating the electrolyte to its boiling point, it is only possible to raise the temperature of a battery stored at —40° C. to approximately —15° C. at which temperature it can use its energy only at moderate rates. Another disadvantage of this method of heating the cell is that, on initial contact of the heated electrolyte with the separators and active materials, deleterious effects result, thereby interfering with the extended performance of the battery.

It is, therefore, a primary object of this invention to provide an electrolyte composition for the cells of deferred-action electrochemical batteries or accumulators which instantaneously activates such cells even after prolonged storage at low temperatures.

It is another object of the invention to provide electrolyte composition capable of providing a modicum of control over the temperature of the electrolyte, in a cell to be so activated, as it rises to levels of normal operation.

Other objects and advantages of the invention will be readily apparent from the following description.

Generally, the objects of the invention are attained by the provision of an electrolyte composition which reacts exothermally with at least one of the electrodes in an electrode system and which comprises an alkali-metal hydroxide and an additive including a lower-alkyl aldehyde either alone or in combination with a lower-alkyl alcohol.

Although either sodium hydroxide or potassium hydroxide can be utilized as the major component of the electrolyte, the potassium hydroxide is preferred.

Among the lower-alkyl aldehydes and alcohols which can be employed in the practice of this invention there are formaldehyde, acetaldehyde, propionaldehyde, butyraldehyde, methyl alcohol, ethyl alcohol, propyl alcohol and isobutyl alcohol, as well as isomeric forms of these compounds.

When preparing the new electrolyte composition of this invention, the specific components can be utilized within a wide range of relative proportions. The alkali-metal hydroxide is employed in water solution in the manner well known to the art. Generally, the concentration of hydroxide is in the range of 20 to 50% by weight. On the other hand, the aldehyde (or aldehyde-and-alcohol mixture) is employed in a range of 5.0 to 50% by weight, based on the weight of the electrolyte solution, preferably in a concentration not greater than about 15%. Although these percentages are not critical, the advantages afforded by this invention are not fully realizable outside these limitations even though the effect of the additive is measurable.

Where a mixed additive is employed the aldehyde and alcohol are utilized in a range of 4 to 40% aldehyde and 1 to 10% alcohol, based on the total weight of the solution. The presence of the alcohol in these proportions affords good control of temperature as it rises to normal operating levels.

The new compositions of this invention can be prepared simply by mixing the components in the desired amount at room temperature and stirring them to form a homogeneous solution.

The electrolyte thus obtained can be employed with a variety of electrode couples so long as the additive reacts exothermally with either the positive or the negative electrode of the system. Among such exothermally reacting couples there are the silver/zinc system, the silver/lead system, the silver/copper system and the silver/cadmium system. It is to be understood that the above-named electrode systems are not restrictive but merely illustrative in carrying out the practice of the present invention. The silver/zinc system, however, is one of the most versatile and widely employed couples.

In order more fully to describe the present invention, the following illustrative examples are given. In the examples, all parts and percents are by weight unless otherwise stated.

EXAMPLE I

A deferred-action silver/zinc battery having a rated capacity of 12.5 ampere hours was stored at —45° C. over night. 100 cc. of an electrolyte which contained 45% KOH in water, having a specific gravity of 1.445, was added to the cell. This cell was used as a control. A similar cell was activated by the addition of 100 cc. of an electrolyte containing 45% KOH in water, having a specific gravity of 1.445, and which also contained 60 gr. of a 38% solution of formaldehyde. The cell temperature is set forth in the following table.

*Table I*

| Time after activation: | Temperature, ° C.[1] |
|---|---|
| 5 sec. | —23 |
| 15 sec. | —18 |
| 30 sec. | —6.67 |
| 60 sec. | +37.78 |
| 3 min. | 72.22 |

[1] Temperature recorded by means of Copper-Constantan Thermocouple located in cell pack and recording potentiometer.

An electric load (19 amperes) was connected to the battery 1 minute after activation. The voltage measured under load was 1.50 volts. The control cell did not reach this voltage within one hour. The capacity yield was 70% of normal room-temperature capacity.

EXAMPLE II

A battery stored in the manner described in Example I was activated with an electrolyte containing 44% aqueous potassium hydroxide diluted to 33% concentration with acetaldehyde. The time elapsed to reach operating voltage at 10° C. was one minute and 50 seconds compared to more than one hour necessary for the control.

EXAMPLE III

A deferred-action silver/zinc battery having a rated capacity of 12.5 ampere hours was stored at −45° C. over night. 100 cc. of an electrolyte which contained 45% KOH in water, having a specific gravity of 1.445, was added to the cell. This cell was used as a control. A similar cell was activated by the addition of 100 cc. of an electrolyte containing 45% KOH in water, having a specific gravity of 1.445, and which also contained 40 gr. of a 38% solution of formaldehyde and 20 gr. of absolute methol alcohol.

*Table II*

| Time after activation: | Temperature, °C.[1] |
|---|---|
| 5 sec | −22.2 |
| 15 sec | −15.5 |
| 30 sec | +1.11 |
| 1 min | 15.5 |
| 3 min | 20.0 |

[1] Temperature recorded by means of Copper-Constantan Thermocouple located in cell pack and recording potentiometer.

The temperature never rose above 20° C. The data above illustrate the control of temperature when a lower alkyl alcohol is employed with the aldehyde. As in the foregoing example, the control did not reach operating voltage within one hour. In the cell which contained electrolyte additive, a load of 19 amperes was employed after one minute and the voltage under load was 1.50 volts. The capacity yield was 80% of normal room temperature capacity.

The electrolyte compositions of this invention present many advantages. For example, the new electrolytes can be employed to raise a cell to normal operating temperature in a minimum amount of time after the cell has been subjected to extremely low temperatures for a long period. Furthermore, the aldehydes and/or aldehydes and alcohols employed as additives in the electrolyte composition are readily available through normal commercial channels and are inexpensive. Numerous other advantages of the invention will be readily apparent to those skilled in the art.

Numerous modifications and embodiments of this invention can be made without departing from the spirit and scope thereof, hence it is to be understood that the invention is not to be limited to the embodiments disclosed herein except as defined in the appended claims.

We claim:

1. An electrochemical device comprising a positive electrode containing silver as an active metal, a negative electrode containing an active metal more electronegative than silver, and an electrolyte between said electrodes, said electrolyte being an aqueous alkaline solution including at least 5% by weight of an organic ingredient selected from the group which consists of lower alkyl aldehydes and mixtures of lower alkyl aldehydes and lower alkyl alcohols.

2. A device according to claim 1 wherein said ingredient is present in a proportion up to substantially 50% by weight of said electrolyte.

3. A device according to claim 2 wherein said ingredient is a mixture consisting of 4 to 40% aldehyde and 1 to 10% alcohol, based on the weight of said electrolyte.

4. An alkaline electrochemical battery comprising a silver electrode, an electrode selected from the group consisting of zinc, lead, copper and cadmium, and an electrolyte comprising an alkali metal hydroxide in aqueous solution containing an additive selected from the group consisting of lower alkyl aldehydes and mixtures of lower alkyl aldehydes and lower alkyl alcohols, said additive being present in an amount at least equal to about 5% by weight of the electrolyte.

5. An alkaline electrochemical battery according to claim 4 wherein the aldehyde is formaldehyde.

6. An alkali electrochemical battery according to claim 4 wherein the aldehyde is acetaldehyde.

7. An alkaline electrochemical battery according to claim 4 wherein the aldehyde is propionaldehyde.

8. An alkaline electrochemical battery according to claim 4 wherein the alcohol is ethyl alcohol.

9. An alkaline electrochemical battery according to claim 4 wherein the alcohol is methyl alcohol.

10. An alkaline electrochemical battery according to claim 4 wherein the hydroxide is potassium hydroxide.

References Cited in the file of this patent

UNITED STATES PATENTS

| 1,343,138 | Jones | June 8, 1920 |
| 1,450,984 | Matheson | Apr. 10, 1923 |
| 1,506,425 | Heise | Aug. 26, 1924 |
| 2,610,219 | Yardeny | Sept. 9, 1952 |
| 2,727,082 | Chubb et al. | Dec. 13, 1955 |
| 2,912,478 | Justi et al. | Nov. 10, 1959 |
| 2,925,454 | Justi et al. | Feb. 16, 1960 |
| 2,980,749 | Broers | Apr. 18, 1961 |

FOREIGN PATENTS

| 206,028 | Austria | Nov. 10, 1959 |

OTHER REFERENCES

Mann: Transactions of Electrochemical Society, vol. LXIX, 1936, pages 115 and 123 relied on.